Patented Feb. 27, 1951

2,543,223

UNITED STATES PATENT OFFICE 2,543,223

PROCESSES FOR BREAKING PETROLEUM EMULSIONS

Charles M. Blair, Jr., Webster Groves, Mo., assignor to Petrolite Corporation, Ltd., Wilmington, Del., a corporation of Delaware No Drawing. Application November 9, 1948,
Serial No. 59,189

11 Claims. (Cl. 252—338)

This invention relates to processes or procedures particularly adapted for preventing, breaking, or resolving emulsions of the water-in-oil type, and particularly petroleum emulsions.

One aspect of my invention is concerned with the new chemical products or compounds used as the demulsifying agents in the present processes or procedures, as well as the application of such chemical compounds, products, and the like, in various other arts and industries, along with methods for manufacturing said new chemical products or compounds which are of outstanding value in demulsification.

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

The demulsifying agent contemplated by the present process consists of an alkylated aromatic sulfonic acid salt of an imidazoline of the kind which will be more completely described below. It has previously been recognized that these imidazolines have surface-active properties, and in some cases, have some demulsifying action. I have found, however, that their action on petroleum emulsions is greatly enhanced if they are neutralized, either wholly or partially, with the alkylated aromatic sulfonic acid. Suitable acids for this purpose may be represented by the following structural formulae:

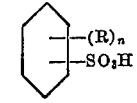

and

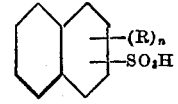

where R is an aliphatic hydrocarbon radical containing from 1 to 20 carbon atoms and n is a numeral 1, 2 or 3. Sulfonic acids of this type are well-known in industry and their preparation need not be described in detail. Many of these sulfonic acids appear industrially in the form of their sodium salts and ammonium salts and are used as wetting agents and detergents. Examples of such materials would include monodecylbenzene sulfonic acid, decyl xylene sulfonic acid, triisoamylbenzene sulfonic acid, octadecyltoluene sulfonic acid, diisopropyl naphthalene sulfonic acid, monopropyl naphthalene sulfonic acid, mono normal butyl naphthalene sulfonic acid, methyl monobutyl naphthalene sulfonic acid, diamyl naphthalene sulfonic acid, monodecyl naphthalene sulfonic acid, etc.

Other alkylated aromatic sulfonic acids besides the benzene and naphthalene derivatives are also effective. Such include the alkylated diphenyl derivatives and alkylated diphenyl methane derivatives analogous to those mentioned above.

Summarizing suitable sulfonic acids for use in preparing my products may be characterized as alkylated aromatic sulfonic acids having molecular weights within the range of 170 to 1200, and represented by the formula:

where R' is an aromatic residue, R is an aliphatic hydrocarbon radical containing from 1 to 20 carbon atoms, and n is the numeral 1 to 3, inclusive.

Imidazolines which I have found to be particularly effective demulsifiers when neutralized with the above described sulfonic acids belong to the general class of cyclic amidines, and in particular, are substituted imidazolines, in which the imidazoline molecule contains at least one hydrocarbon group containing from 6 to 26 carbon atoms. Cyclic imidazolines in which the 2-carbon atom is substituted by a long chain aliphatic hydrocarbon group are particularly easy to prepare and are very effective for the present use. However, it has been found that equally effective compounds, if not somewhat more effective in some instances, result when the aliphatic or other hydrocarbon group occurs as a substituent of one of the nitrogen atoms, or of a relatively small organic radical attached to one of the nitrogen atoms.

The imidazolines herein contemplated as the cation constituent of my demulsifier may be represented by the following general formulae:

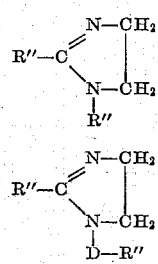

in which R″ is either hydrogen or a hydrocarbon group, D is a divalent organic radical containing less than 25 carbon atoms, composed of elements from the group consisting of C, H, O and N, and where at least one occurrence of R″ contains 6 to 26 carbon atoms.

I have found that particularly outstanding demulsifier reagents result when the imidazoline compound contains basic nitrogen groups, in addition to those inherently present in the imidazoline ring. In general, compounds of this type which are effective are those in which the basic nitrogen group is contained in the radical D in the above formula. The nature of this substituent will be further described below.

The preparation of an imidazoline substituted in the 2-position by aliphatic hydrocarbon radicals is well described in the literature and is readily carried out by reaction between a carboxylic acid and a diamine, or polyamine, containing at least one primary amino group, and at least one secondary amino group, or another primary amino group separated from the first primary amino group by two carbon atoms. Examples of suitable polyamines which can be employed for this conventional imidazoline synthesis include ethylene-diamine, diethylenetriamine, triethylenetetramine, tetraethylenepentamine, 1,2-diaminopropane, N-ethylethylenediamine, N,N - dibutyldiethylenetriamine, 1,2 - diaminobutane, hydroxyethylethylenediamine and the like. For details of the preparation of these reagents, see the following U. S. patents: U. S. Nos. 1,999,989, dated April 30, 1935, to Max Bockmuhl et al.; 2,155,877, dated April 25, 1939, to Edmund Waldmann et al.; 2,155,878, dated April 25, 1939, to Edmund Waldmann et al. See also Chem. Rev. 32, 47 (43).

When a carboxylic acid containing 7 or more carbon atoms is employed in the above described synthesis the resulting imidazoline will contain a 2-substituent consisting of a hydrocarbon radical containing 6 or more carbon atoms. Suitable imidazolines, therefore, may be made directly by reaction of acids such as oleic acid, linoleic acid, erucic acid, talloil fatty acids, naphthenic acids, nonoic acid, octoic acid, toluic acid, cyclohexylacetic acid, cyclohexylpropionic acid, and the like, with suitable amines, such as those enumerated above.

Particularly suitable for preparation of the imidazolines employed in the manufacture of my demulsifier are the naturally-occurring fatty acids, such as lauric acid, palmitic acid, oleic acid, stearic acid, or mixed fatty acid products. Actually, in the manufacture of imidazolines by the above mentioned method, either the fatty acid or its ester such as the methyl ester or the glyceride, may be employed. When an ester is employed, the alcohol is apparently split off during reaction and appears in the product as an impurity. If the alcohol is sufficiently low-boiling, it will be distilled off during the course of the reaction.

Because of their ready availability and low cost as well as their ability to form very effective reagents, the naphthenic acids from petroleum or petroleum products are often employed in this synthesis. Naphthenic acids may vary in the number of carbon atoms from as few as 6 to perhaps 20 or more. Reference is made to "Organic Chemistry" by Fieser and Fieser, D. C. Heath & Co. (1944) page 88 et seq. and the article of J. A. Breger, Journal of Phy. & Colloid Chem. 53, 559 (1948) for a description of the chemical nature of naphthenic acids.

The most commonly available naphthenic acids of commerce are those having molecular weights in the range of about 230 to 260, and are thought to contain two cyclopentyl or cyclohexyl rings.

Tall oil is another cheap and available acidic raw material suitable for the present synthesis. This is usually obtained as a by-product in the manufacture of paper and consists of a mixture of fatty acids and rosin acids with a small amount of unsaponifiable matter. Reference is made to "Fats and Oils" by H. G. Kirschenbauer, Rheinhold Publishing Corp. (1944), page 98, for a detailed description of tall oil. Abietic acid, dihydroabietic acid, tetrahydroabietic acid or rosin may also be used in the present synthesis to yield very effective imidazolines. For a detailed description of such resin acids and others suitable for this use, see the article by Harold H. Feiss, Chemical Reviews, 42, 163 (1948).

Imidazolines in which the hydrocarbon group, R″, is substituted by simple groups, such as halogen, are equally effective for preparing the present products, and the halogen substituted hydrocarbon groups are, for all practical purposes, the equivalent of hydrocarbon groups in the present application.

When a condensation is carried out at a temperature of 250° or higher, between equal mole proportions of carboxylic acid and polyamine, two moles of water are evolved and the desired imidazoline is formed in almost quantitative yield. Such suitable reagents may be represented by the following formula:

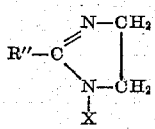

where X may be hydrogen, ethylene amino radicals, hydroxyethylamino radicals, aminoalkyl radicals, aliphatic hydrocarbon radicals, aromatic hydrocarbon radicals, cycloaliphatic hydrocarbon radicals or similar; and where R″ is a hydrocarbon radical. As pointed out previously, at least one of the groups R'' and X must contain a higher molecular weight hydrocarbon group of from 6 to 20 carbon atoms. Where such group occurs as a portion of the substituent X, the remainder of this constituent will be a divalent organic radical linking such group to the 1-nitrogen atom, and will generally contain less than about 25 carbon atoms. In the above formulae for imidazolines it should be pointed out that where X is a hydrogen atom, the nitrogen atoms become equivalent, insofar as reaction is concerned, and cannot be distinguished from one another. This is supposed, on theoretical grounds, to result from the mobility of the hydrogen proton, and its ease of transfer from one nitrogen atom to the other. However, where X is an organic substituent other than hydrogen, the nitrogen atoms are no longer equivalent. For the purpose of the present application, the nitrogen atom to which the radical X is attached will be called the 1-nitrogen atom of the imidazoline ring. This is in conformance with the usual chemical convention in numbering heterocyclic ring positions.

As mentioned above, I have discovered that equally suitable reagents may be obtained by introducing into the imidazoline compound a hydrocarbon group of proper size as a portion of the substituent attached to the 1-nitrogen atom of the imidazoline ring. Where the hydrocarbon group occurs in this position, it is unnecessary that the 2-carbon atom substituent contain 6 or more carbon atoms. It may be, in fact, only a hydrogen atom or a methyl group, ethyl group, phenyl group, or other relatively small hydrocarbon group, although it is not restricted to such small groups. The preparation of imidazoline compounds, in which the higher molecular weight hydrocarbon radical occurs as a portion of the nitrogen atom substituent, is also readily carried out by methods analogous to those already described. In this case, however, a number of alternative procedures are possible. For example, one may prepare 2-methyl, 1-(octadecylaminoethyl-) imidazoline by reaction of octadecyl aminoethylethylenediamine with acetic acid at a temperature of 250° to 300° C. until two moles of water are evolved for every mole of acetic acid employed. The same reagent may result by the preparation of 2-methyl, 1-aminoethyl imidazoline, followed by alkylation with octadecyl bromide and sepaation of resulting alkylation products, to isolate the desired product. For the prepation of 1,2-substituted imidazolines, see King & McMillan, J. A. C. S. 68, 1774 (1946), and Kyrides et al., Journal Organic Chemistry, 12, 577 (1947).

Examples of suitable substituted imidazolines, in which the hydrocarbon group containing from 6 to 26 carbon atoms in a 2-position substituent are as follows:

(1)

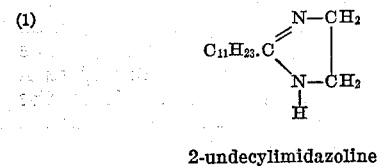

2-undecylimidazoline (2)

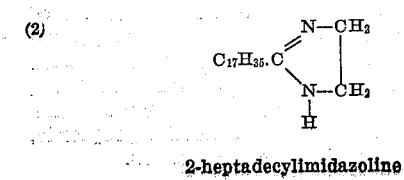

2-heptadecylimidazoline (3) 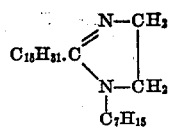

2-pentadecyl, 1-heptylimidazoline (4) 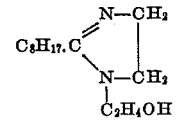

2-octyl, 1-hydroxyethylimidazoline (5) 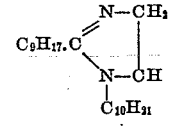

2-nonyl, 1-decylimidazoline (6) 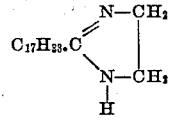

2-oleylimidazoline (7) 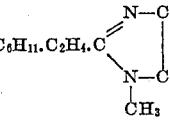

2-cyclohexylethyl, 1-methylimidazoline (8) 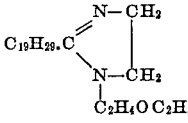

2-abietyl, 1-ethyloxyethylimidazoline (9) 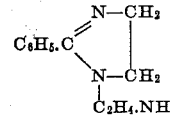

2-phenyl, 1-aminoethylimidazoline

(10) 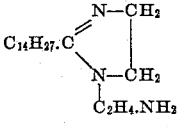

2-substituted imidazoline from naphthenic acid (from kerosene) and diethylenetriamine Suitable substituted imidazolines in which the hydrocarbon group containing from 6 to 26 carbon atoms is the 1-position substituent, or a part of this substituent, are exemplified by the following:

(1) 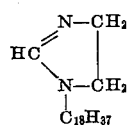

1-octadecylimidazoline (2) 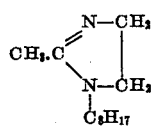

2-methyl, 1-octylimidazoline

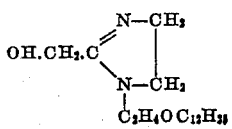

1-dodecyloxyethyl, 2-hydroxymethylimidazoline (4)

Cl.CH₂.C—N—CH₂ / N—CH₂
|
C₂H₄OOC₁₈H₃₃

1-oleoyloxyethyl, 2-chloromethylimidazoline (5)

C₂H₅.C—N—CH₂ / N—CH₂
|
C₂H₄.NH.C₁₀H₂₁

1-N-decylaminoethyl, 2-ethylimidazoline (6)

HC—N—CH₂ / N—CH₂
|
C₂₀H₃₁

1-abiethylimidazoline

It was mentioned above that imidazolines containing basic nitrogen groups, in addition to those occurring in the imidazoline ring, are particularly effective agents for preparation of demulsifiers. Such products are readily prepared from the commercially available polyethylene polyamines, or from polyamines in which there are three or more amino groups and in which there is at least one primary amino group separated by two carbon atoms from a secondary or primary amino group. Examples of suitable preferred compounds of this type are the following:

(1)

C₁₇H₃₅.C—N—CH₂ / N—CH₂
|
C₂H₄.NH₂

2-heptadecyl, 1-aminoethylimidazoline (2)

C₁₇H₃₅.C—N—CH₂ / N—CH₂
|
C₂H₄.NH.C₂H₄.NH₂

2-heptadecyl, 1-diethylenediaminoimidazoline (3)

CH₃.C—N—CH₂ / N—CH₂
|
C₂H₄.NH.C₂H₄.NH.C₁₆H₃₃

2-methyl, 1-hexadecylaminoethylaminoethylimidazoline (4)

H.C—N—CH₂ / N—CH₂
|
C₃H₆.NH.C₁₂H₂₅

1-dodecylaminopropylimidazoline (5)

H.C—N—CH₂ / N—CH₂
|
C₂H₄.NH.C₂H₄OOC.C₁₇H₃₅

1-stearoyloxyethylaminoethylimidazoline (6)

C₂H₅.C—N—CH₂ / N—CH₂
|
C₂H₄.N.C₂H₄OH
|
C₁₂H₂₅

2-ethyl, 1-(N,N-dodecyl, hydroxyethyl) aminoethylimidazoline

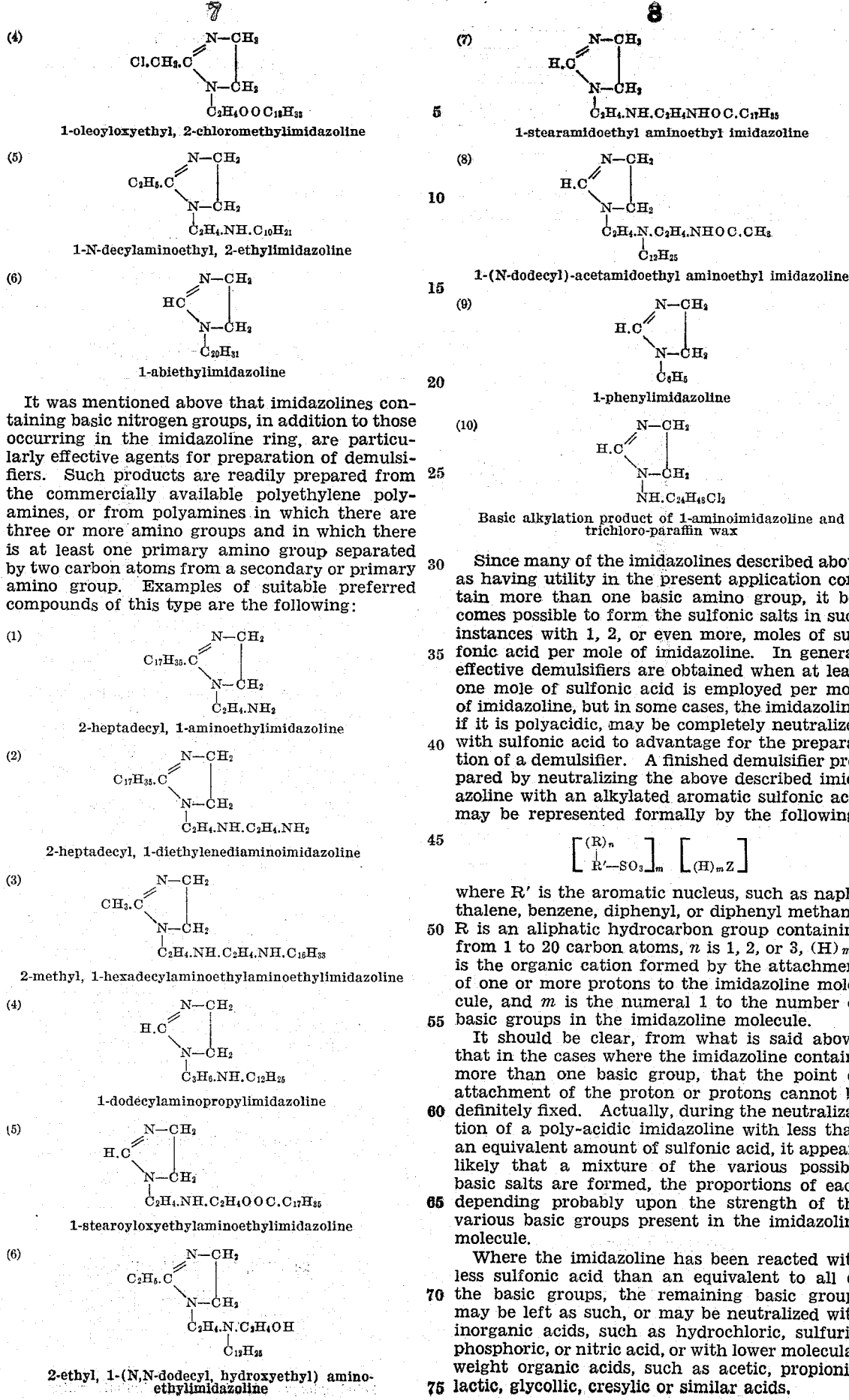

(7)

H.C—N—CH₂ / N—CH₂
|
C₂H₄.NH.C₂H₄NHOC.C₁₇H₃₅

1-stearamidoethyl aminoethyl imidazoline (8)

H.C—N—CH₂ / N—CH₂
|
C₂H₄.N.C₂H₄.NHOC.CH₃
|
C₁₂H₂₅

1-(N-dodecyl)-acetamidoethyl aminoethyl imidazoline (9)

H.C—N—CH₂ / N—CH₂
|
C₆H₅

1-phenylimidazoline (10)

H.C—N—CH₂ / N—CH₂
|
NH.C₂₄H₄₆Cl₂

Basic alkylation product of 1-aminoimidazoline and trichloro-paraffin wax

Since many of the imidazolines described above as having utility in the present application contain more than one basic amino group, it becomes possible to form the sulfonic salts in such instances with 1, 2, or even more, moles of sulfonic acid per mole of imidazoline. In general, effective demulsifiers are obtained when at least one mole of sulfonic acid is employed per mole of imidazoline, but in some cases, the imidazoline, if it is polyacidic, may be completely neutralized with sulfonic acid to advantage for the preparation of a demulsifier. A finished demulsifier prepared by neutralizing the above described imidazoline with an alkylated aromatic sulfonic acid may be represented formally by the following:

$$\left[ \begin{array}{c} (R)_n \\ | \\ R'-SO_3 \end{array} \right]_m \left[ (H)_m Z \right]$$

where R' is the aromatic nucleus, such as naphthalene, benzene, diphenyl, or diphenyl methane, R is an aliphatic hydrocarbon group containing from 1 to 20 carbon atoms, $n$ is 1, 2, or 3, $(H)_mZ$ is the organic cation formed by the attachment of one or more protons to the imidazoline molecule, and $m$ is the numeral 1 to the number of basic groups in the imidazoline molecule.

It should be clear, from what is said above, that in the cases where the imidazoline contains more than one basic group, that the point of attachment of the proton or protons cannot be definitely fixed. Actually, during the neutralization of a poly-acidic imidazoline with less than an equivalent amount of sulfonic acid, it appears likely that a mixture of the various possible basic salts are formed, the proportions of each depending probably upon the strength of the various basic groups present in the imidazoline molecule.

Where the imidazoline has been reacted with less sulfonic acid than an equivalent to all of the basic groups, the remaining basic groups may be left as such, or may be neutralized with inorganic acids, such as hydrochloric, sulfuric, phosphoric, or nitric acid, or with lower molecular weight organic acids, such as acetic, propionic, lactic, glycollic, cresylic or similar acids.

Examples of suitable demulsifying agents of the kind contemplated are given below:

EXAMPLE 1

To 349 grams of 1-heptadecylene,2-aminoethylimidazoline (prepared from oleic acid and diethylenetriamine) was added 320 grams of crude diisopropyl naphthalene sulfonic acid (consisting of about 80% sulfonic acid, 11% hydrocarbon and 9% water and isopropyl alcohol). The mixture was stirred vigorously during addition of the acid mass. After completion of the neutralization, the product was dissolved in an equal weight of cresylic acid to yield a homogeneous, fluid composition suitable for commercial use.

EXAMPLE 2

103 grams of diethylenetriamine and 327 grams of commercial tall oil (acid value=171) were reacted at 290° C. until 36 ml. of water was collected as distillate. This product was added slowly, with stirring, to 866 grams of a washed "keryl" benzene sulfonic acid which assayed 75% alkyl benzene sulfonic acid. "Keryl" benzene is prepared by alkylation of benzene with a monochlorinated kerosene cut, and analyzes as approximately $C_{12}H_{23}$—$C_6H_5$. This product is then sulfonated by a conventional procedure. The salt prepared above is the disulfonic acid salt of the imidazoline.

EXAMPLE 3

236 grams of commercial naphthenic acid (acid value=238) and 104 grams of hydroxyethylethylenediamine were reacted to form 2-naphthenyl, 1-hydroxyethylimidazoline. This compound was added slowly, with stirring, to 302 grams of butyl isopropyl naphthalene sulfonic acid.

EXAMPLE 4

351 grams of 2-heptadecyl, 1-aminoethylimidazoline was neutralized with 320 grams of the sulfonic acid of Example 1, and the salt was dissolved in an equal weight of aromatic naphtha to form a clear homogeneous solution.

EXAMPLE 5

140 grams of oleic acid and 66 grams of dipropylenetriamine were reacted at 290° C. for 1½ hours. 18.5 ml. of water were evolved. The product was then mixed with 160 grams of the sulfonic acid of Example 1.

EXAMPLE 6

60 grams of acetic acid and 104 grams of hydroxyethylethylenediamine were reacted at 290° C. to form 2-methyl, 1-hydroxyethylimidazoline. One mole (284 grams) of stearic acid was added to this product and the mixture heated at 200° C. until esterification of the acid was practically complete. A slow stream of nitrogen was passed through the reaction mass continuously. The resulting 2-methyl, 1-steroyloxyethylimidazoline was neutralized with one mole of methyl isopropyl diphenyl sulfonic acid.

EXAMPLE 7

One mole (189 grams) of tetraethylenepentamine, and one mole (60 grams) of acetic acid were reacted at 285° C. for 4 hours. To the resulting product was added 167 grams of chlorinated paraffin wax (40% chlorine content) and the resulting mixture was heated to 140° C., at which point the alkylation reaction proceeded spontaneously. The temperature was held below 195° C. by cooling. The resulting 2-methylimidazoline was substituted in the 1-position by a tri-ethylenetriamino group in which one or two of the amino groups had been alkylated by a chloroalkyl group and converted to the hydrochloride. This product was neutralized with 360 grams of the sulfonic acid of Example 1.

The outstanding demulsifying action of these reagents is exemplified by the results presented in the table.

These data were obtained from laboratory demulsification tests, in which the concentration of demulsifier shown was added to 100 ml. of emulsion contained in a bottle. The bottle was warmed to 90° F., closed, and then shaken for 3 minutes at the rate of 150 strokes per minute. It was then placed in a water bath at 90° F. and allowed to settle for 20 minutes. After expiration of the settling period, the samples were observed for degree of water separation and clarity of the oil. For comparison, similar tests were made with an ammonia neutralized sulfonic acid of the type used to neutralize the imidazoline.

Table
EFFECT OF PRESENT PRODUCTS ON PETROLEUM EMULSIONS

| Demulsifier added | Concentration of Demulsifier in the Emulsion | Source of Emulsion | Result of Test |
| --- | --- | --- | --- |
| | Percent | | |
| Demulsifier of Example 6 | 0.07 | St. Gabriel, Louisiana | Rapid and complete separation of phases. |
| Ammonium diisopropylnaphthalene sulfonate. | 0.07 | ___do___ | Partial separation of phases. Dirty oil. |
| Demulsifier of Example 2 | 0.08 | Ada, Oklahoma | Good separation of phases. |
| Ammonium "keryl" benzene | 0.08 | ___do___ | Incomplete resolution. |
| Demulsifier of Example 6 | 0.016 | Hastings, Texas | Complete Break. Good separation. |
| Ammonium diisopropyl naphthalene sulfonate. | 0.016 | ___do___ | Partial, but incomplete resolution. |

These results clearly show that the products of the present invention are effective demulsifiers and are superior to the ammonia neutralized products prepared from the same sulfonic acids as those employed in the imidazoline salt preparation. The results of the table are typical of those obtained with the imidazoline salts of sulfonic acids on many other naturally-occurring petroleum emulsions.

Conventional demulsifying agents employed in the treatment of oil field emulsions are used as such, or after dilution with any suitable solvent, such as water, petroleum hydrocarbons, benzene, toluene, xylene, tar acid oil, cresol, anthracene oil, etc. Alcohols, particularly aliphatic alcohols, such as methyl alcohol, ethyl alcohol, denatured alcohol, propyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000, or 1 to 20,000, or 1 to 30,000, or even 1 to 40,000, or 1 to 50,000 as in desalting practice, such an apparent insolubility in oil and water is not significant, because said reagents undoubtedly have solubility within such concentrations. This same fact is true in regard to the material or materials employed as the demulsifying agent of our process.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example, by agitating the tank of emulsion, and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example at the suction side of the said circulating pump.

In a second type of treating procedure, the demulsifier is introduced into the well fluids at the well-head or at some point between the well-head and the final oil storage tank, by means of an adjustable proportioning mechanism or proportioning pump. Ordinarily, the flow of fluids through the subsequent lines and fittings suffices to produce the desired degree of mixing of demulsifier and emulsion, although, in some instances, additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow, or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier dropwise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom, so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

Besides utility as demulsifiers, the compounds of the present invention have found utility as additives for asphalt to improve the adhesion of the asphalt to hydrophilic rocks, and as Diesel fuel and lubricant additives which improve said fuels and oils with respect to varnish and gum formation and wearing effect.

Having thus described my invention, what I claim as new and desire to secure by Letters Patent is:

1. A process for breaking petroleum emulsions of the water-in-oil type, characterized by subjecting the emulsion to the action of an imidazoline salt of an alkylated aromatic monosulfonic acid; said salt being that of an imidazoline selected from the class consisting of

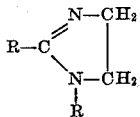

and

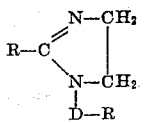

where R is selected from the class consisting of hydrogen and hydrocarbon groups, D is a divalent, organic radical containing less than 25 carbon atoms, composed of elements selected from the group consisting of C, H, O and N; with the proviso that at least one occurrence of R is a hydrocarbon group containing from 6 to 26 carbon atoms; and with the added proviso that said sulfonic acid have at least one and not more than 3 alkyl constituents containing from 1 to 20 carbon atoms.

2. A process for breaking petroleum emulsions of the water-in-oil type, characterized by subjecting the emulsion to the action of a substituted imidazoline salt of an alkylated aromatic monosulfonic acid; the substituents of said imidazoline being limited to the one and two ring positions; said substituted imidazoline being characterized by the fact that at least one substituent includes as an integral part thereof a hydrocarbon group having at least 6 and not over 26 carbon atoms, and that the total number of nitrogen atoms in said substituted imidazoline be not over 7; and with the added proviso that said sulfonic acid have at least 1 and not more than 3 alkyl substituents containing from 1 to 20 carbon atoms.

3. The process of claim 2, wherein the substituted imidazoline is obtained from a high molal monocarboxy, detergent-forming acid having at least 8 and not more than 22 carbon atoms.

4. The process of claim 2, wherein the substituted imidazoline is obtained from a higher fatty acid having at least 8 and not over 22 carbon atoms.

5. The process of claim 2, wherein the substituted imidazoline is obtained from a higher fatty acid having at least 8 and not over 22 carbon atoms, with a further proviso that the imidazoline contains at least 3 and not over 6 nitrogen atoms.

6. The process of claim 2, wherein the substituted imidazoline is obtained from a higher fatty acid having at least 8 and not over 22 carbon atoms, with the proviso that the imidazoline contains at least 3 and not over 6 nitrogen atoms, with the added proviso that the alkylated aromatic monosulfonic acid is an alkylated naphthalene sulfonic acid.

7. The process of claim 2, wherein the substituted imidazoline is obtained from a higher fatty acid having at least 8 and not over 22 carbon atoms, with the proviso that the imidazoline contains at least 3 and not over 6 nitrogen atoms; with the added proviso that the alkylated aromatic monosulfonic acid is an alkylated naphthalene sulfonic acid, wherein the alkyl substituents contain at least 3 and not more than 5 carbon atoms.

8. The process of claim 2, wherein the substituted imidazoline is obtained from a higher fatty acid having at least 8 and not over 22 carbon atoms, with the proviso that the imidazoline contains at least 3 and not over 6 nitrogen atoms; with the added proviso that the alkylated aromatic monosulfonic acid is a dialkyl substituted naphthalene sulfonic acid, wherein the alkyl group contain at least 3 and not more than 5 carbon atoms.

9. The process of claim 2, wherein the substituted imidazoline is obtained from a higher fatty acid having at least 8 and not over 22 carbon atoms, with the proviso that the imidazoline contains at least 3 and not over 6 nitrogen atoms; with the added proviso that the alkylated aromatic monosulfonic acid is diisopropyl napthalene sulfonic acid.

10. The process of claim 2, wherein the substituted imidazoline is obtained from a higher fatty acid having at least 8 and not over 22 carbon atoms, with the proviso that the imidazoline contains at least 3 and not over 6 nitrogen atoms; with the added proviso that the alkylated aromatic monosulfonic acid is dibutyl naphthalene sulfonic acid.

11. The process of claim 2, wherein the substituted imidazoline is obtained from a higher fatty acid having at least 8 and not over 22 carbon atoms, with the proviso that the imidazoline contains at least 3 and not over 6 nitrogen atoms; with the added proviso that the alkylated aromatic monosulfonic acid is diamyl naphthalene sulfonic acid.

CHARLES M. BLAIR, JR.

REFERENCES CITED

The following references are of record in the file of this patent:

UNITED STATES PATENTS

| Number | Name | Date |
|---|---|---|
| 2,083,224 | De Groote | June 8, 1937 |
| 2,083,225 | De Groote | June 8, 1937 |